United States Patent
Hong et al.

(10) Patent No.: US 9,457,309 B2
(45) Date of Patent: Oct. 4, 2016

(54) STRUCTURE FOR PREVENTING AIR LEAKAGE AND AIR CLEANER HAVING THE SAME

(71) Applicants: COWAY CO., LTD, Chungcheong-nam-do (KR); WINIX INC., Gyeonggi-do (KR)

(72) Inventors: Hyun-Jin Hong, Seoul (KR); Chan-Jung Park, Seoul (KR); Sang-Woo Kang, Seoul (KW)

(73) Assignees: COWAY CO., LTD, Chungcheongnam-Do (KR); WINIX INC., Gyeonggi-Do (KR)

( * ) Notice: Subject to any disclaimer, the term of this patent is extended or adjusted under 35 U.S.C. 154(b) by 95 days.

(21) Appl. No.: 14/383,137

(22) PCT Filed: Mar. 12, 2013

(86) PCT No.: PCT/KR2013/001956
§ 371 (c)(1),
(2) Date: Sep. 5, 2014

(87) PCT Pub. No.: WO2013/141511
PCT Pub. Date: Sep. 26, 2013

(65) Prior Publication Data
US 2015/0020485 A1      Jan. 22, 2015

(30) Foreign Application Priority Data

Mar. 20, 2012 (KR) .......... 10-2012-0028510

(51) Int. Cl.
*B01D 45/12* (2006.01)
*B21K 21/16* (2006.01)
(Continued)

(52) U.S. Cl.
CPC ............ *B01D 46/42* (2013.01); *F24F 7/007* (2013.01); *F24F 13/20* (2013.01); *F24F 2013/205* (2013.01)

(58) Field of Classification Search
CPC ....... B01D 45/12; B21K 21/16; B23P 17/04; F02M 35/0203; F16M 3/00; F24F 3/1603
USPC ....... 55/357, 473, 502; 29/462, 525; 15/327, 15/5; 123/559.1
See application file for complete search history.

(56) References Cited

U.S. PATENT DOCUMENTS 4,047,912 A * 9/1977 Markland .............. B01D 45/12
 123/559.1
5,052,073 A * 10/1991 Iida .......................... F16M 3/00
 15/327.5
(Continued)

FOREIGN PATENT DOCUMENTS

CN 2142506 9/1993
CN 2405642 11/2000
(Continued)

OTHER PUBLICATIONS

Written Opinion of the International Searching Authority PCT/KR2013/001956 (4 Pages) Dated: Jun. 12, 2013.
(Continued)

*Primary Examiner* — Jacob T Minskey
*Assistant Examiner* — Minh-Chau Pham
(74) *Attorney, Agent, or Firm* — Dority & Manning, P.A.

(57) ABSTRACT

There are provided an air leakage preventing structure and an air cleaner having the same. The air leakage preventing structure includes: a partition unit having an inlet opening formed on one side thereof to allow air to be introduced therethrough and having a rib formed to be protruded from the circumference of the inlet opening; an air blowing fan coupled to the partition unit and rotating to allow air to be introduced through the inlet opening; a motor unit connected to the air blowing fan to rotate the air blowing fan; and an air guide unit connected to the rib formed to be protruded from the partition unit to form an outlet opening, and preventing air leakage when air introduced through the net opening flows out through the outlet opening.

6 Claims, 5 Drawing Sheets

(51) Int. Cl.
*B23P 17/04* (2006.01)
*F16M 3/00* (2006.01)
*B01D 46/42* (2006.01)
*F24F 13/20* (2006.01)
*F24F 7/007* (2006.01)

(56) References Cited

U.S. PATENT DOCUMENTS

| | | |
|---|---|---|
| 2002/0104501 A1 | 8/2002 | Kawai |
| 2005/0044688 A1* | 3/2005 | Wynn .................. F24F 3/1603 29/462 |
| 2005/0086966 A1 | 4/2005 | Bae |
| 2008/0286163 A1* | 11/2008 | Garfield .................. A61L 9/205 422/120 |
| 2015/0007530 A1* | 1/2015 | Cho .................. F02M 35/0203 55/357 |
| 2015/0075373 A1* | 3/2015 | Miller .................. F24F 3/1603 95/15 |

FOREIGN PATENT DOCUMENTS

| | | |
|---|---|---|
| CN | 201603482 | 10/2010 |
| CN | 201603485 | 10/2010 |
| JP | 11336693 | 12/1999 |
| JP | 2008223625 | 9/2008 |
| KR | 2007-0096701 A | 10/2007 |
| KR | 2011-0103641 A | 9/2011 |
| KR | 2012-0016900 A | 2/2012 |

OTHER PUBLICATIONS

International Search Report PCT/KR2013/001956 (2 Pages) Dated: Jun. 13, 2013.

Chineses Application / Patent No. 201380015375.9 First Office Action, dated Aug. 4, 2015, with English Translation.

* cited by examiner

STRUCTURE FOR PREVENTING AIR LEAKAGE AND AIR CLEANER HAVING THE SAME

CROSS REFERENCE TO RELATED APPLICATIONS

This application is the U.S. National Stage entry of International Application Number PCT/KR2013/001956, filed under the Patent Cooperation Treaty having a filing date of Mar. 12, 2013, which claims priority to Korean Patent Application Serial Number 10-2012-0028510, having a filing date of Mar. 20, 2012.

TECHNICAL FIELD

The present invention relates to a structure for preventing air leakage and an air cleaner having the same, and more particularly, to an air leakage preventing structure capable of preventing introduced air from being leaked by a structure of an air discharging unit (i.e., a ventilating unit or a fan unit), and an air cleaner having the same.

BACKGROUND ART

In general, an air cleaner is a device for drawing in contaminated indoor air and filtering dust, odor-causing particulates, and the like, therefrom to purify contaminated indoor air to be clean air. The purified air is discharged to the outside of the air cleaner and an indoor area.

Namely, an air cleaner is a device for drawing in contaminated ambient air, purifying the contaminated ambient air, and expelling clean air to purify contaminated ambient air.

To this end, an air cleaner may include an air blower allowing ambient air to be drawn in and purified air expelled, and a filter filtering dust, odor causing particulates, and the like, contained in the introduced air.

Here, the air blower is a device allowing ambient air to be introduced and purified with a filter to be expelled to the outside of the device.

FIG. 1 is a view illustrating a related art air blower (or air discharger). Referring to FIG. 1, in the case of the related art air blower, in order to prevent air introduced by an intake fan provided in the air blower from being leaked through a space formed between an air guide 20 and a partition 10, a leakage preventing member 30 made of polyurethane (PU) foam, or the like, is installed between the air guide 20 and the partition 10.

However, as the air blower is used on a continual basis over a period of time, the leakage preventing member 30 may be worn thin and effused as powder, the degree of air leakage prevention may be gradually reduced, and the powder of the leakage preventing member 30 may be discharged in output air, having a negative impact on the purity of the output air.

In addition, since the leakage preventing member 30 is additionally attached, manufacturing costs are increased and a manufacturing process may be complicated.

DISCLOSURE OF INVENTION

Technical Problem

An air leakage preventing structure and an air cleaner having the same, according to the present invention, has been derived to solve the problem of the related art and provides the following solution thereto.

An aspect of the present invention provides an air leakage preventing structure capable of maintaining a degree of air leakage prevention without a reduction thereof even in the case that it continues to be used over time, and an air cleaner having the same.

An aspect of the present invention also provides an air leakage preventing structure capable of simplifying a manufacturing process and reducing manufacturing costs by eliminating the necessity of installing a member for preventing air leakage, and an air cleaner having the same.

However, objects of the present invention are not limited thereto and any objects and effects that can be recognized from the technical solutions and embodiments described hereinafter may be included therein, even if not clarified.

Solution to Problem

According to an aspect of the present invention, there is provided an air leakage preventing structure including: a partition unit having an inlet opening formed on one side thereof to allow air to be introduced therethrough and having a rib formed to be protruded from the circumference of the inlet opening; an air blowing fan coupled to the partition unit and rotating to allow air to be introduced through the inlet opening; a motor unit connected to the air blowing fan to rotate the air blowing fan; and an air guide unit connected to the rib formed to be protruded from the partition unit to form an outlet opening, and preventing air leakage when air introduced through the inlet opening flows out through the outlet opening.

The air guide unit may have a connection portion connected to the rib and an end portion of the connection portion may be bent.

The connection portion provided in the air guide unit may be bent to have an 'L' shape.

The air guide unit may be in contact with an outer portion of the rib so as to be connected to the rib.

The rib may have a shape corresponding to a shape of the air guide unit.

The air guide unit may have a fastening unit formed on one side thereof and coupled to the partition unit.

According to another aspect of the present invention, there is provided an air cleaner including: an air blowing unit having the foregoing air leakage preventing structure; a housing in which the air blowing unit is disposed; and a filter unit disposed within the housing and purifying air introduced to the interior of the housing by the air blowing unit.

Advantageous Effects of Invention

The air leakage preventing structure and the air cleaner having the same according to embodiments of the present invention have some of the following effects.

In the case of the air leakage preventing structure and the air cleaner having the same according to embodiments of the present invention, since an end portion of a connection portion of an air guide unit connected to a rib is formed to be bent, air leakage can be prevented without having to use any additional member for preventing air leakage.

In the case of the air leakage preventing stricture and the air cleaner having the same according to embodiments of the present invention, although the air leakage preventing structure and the air cleaner are used on a continual basis over a period of time, a degree of leakage prevention is maintained, rather than being reduced.

In the case of the air leakage preventing structure and the air cleaner having the same according to embodiments of the present invention, since a member for preventing air leakage is not required to be additionally attached, the process is simplified and manufacturing costs can be reduced.

The foregoing technical solutions do not fully enumerate all of the features of the present invention. The foregoing and other objects, features, aspects and advantages of the present invention will become more apparent from the following detailed description of the present invention when taken in conjunction with the accompanying drawings.

BEST MODE FOR CARRYING OUT THE INVENTION

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Hereinafter, an air leakage preventing structure and an air cleaner 500 having the same according to an embodiment of the present invention will be described in detail with reference to the accompanying drawings.

Figure 1:
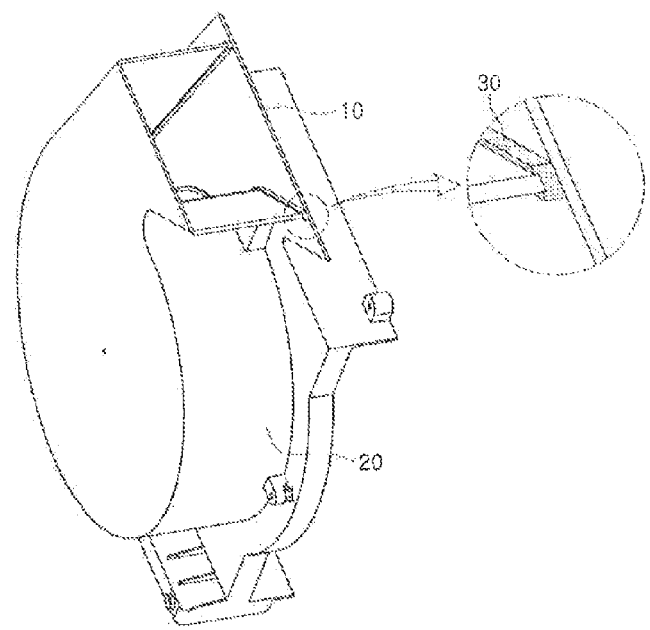
FIG. 1 is a view illustrating an air leakage preventing structure according to a related art.
Figure 2:
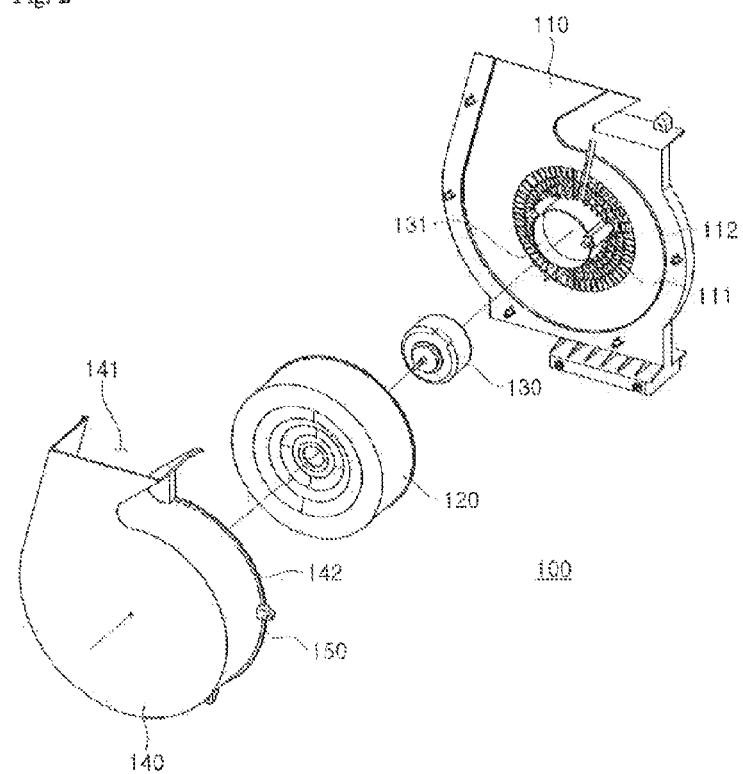
FIG. 2 is an exploded perspective view of an air blowing unit having an air leakage preventing structure according to an embodiment of the present invention.

Referring to FIG. 2, the air leakage preventing structure and the air cleaner 500 having the same according to an embodiment of the present invention include a partition unit 110 having an inlet opening 111 formed in one side thereof and a rib 112 formed to be protruded from the circumference of the inlet opening 111.

Also, the air leakage preventing structure and the air cleaner 500 having the same according to an embodiment of the present invention include an air blowing fan 120 coupled to the partition unit 110 and rotating to allow air to be introduced through the inlet opening 111.

Also, the air leakage preventing structure and the air cleaner 500 having the same according to an embodiment of the present invention include a motor unit 130 connected to the air blowing fan to rotate the air blowing fan 120.

Also, the air leakage preventing structure and the air cleaner 500 having the same according to an embodiment of the present invention include an air guide unit 140 connected to the protruded rib 112 to form an outlet opening 141 and preventing air leakage when air introduced through the inlet opening 111 flows out through the outlet opening 114.

Hereinafter, respective components will be described in detail.

Figure 4:
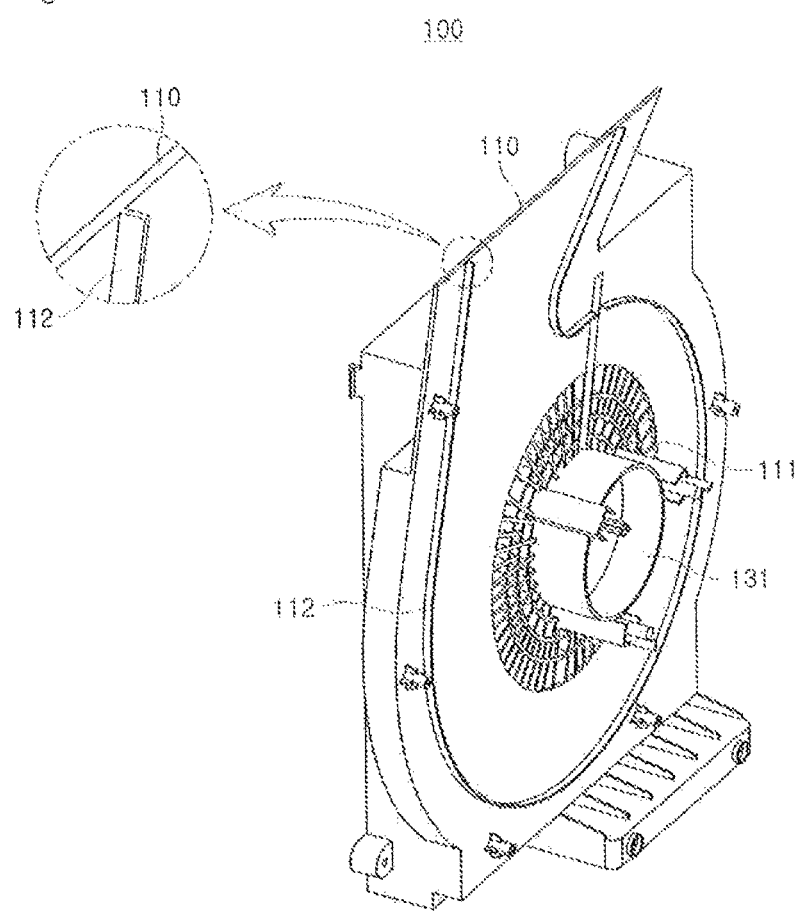
FIG. 4 is a view illustrating a partition unit included in the air blowing unit having the air leakage preventing structure according to an embodiment of the present invention.

Referring to FIG. 4, the partition unit 110 may include the inlet opening 111 formed in one side thereof to allow air to be introduced therethrough and the rib 112 disposed to be protruded from the circumference of the inlet opening 111.

Here, the partition unit 110 may include a motor installation portion 131 in which a motor included in the motor unit 130 is installed.

Referring to FIG. 2, the air blowing fan 120 may be coupled to the partition unit 110, and configured such that when the air blowing fan 120 rotates, air is introduced through the inlet opening 111.

Namely, the air blowing fan 120 may be coupled to the partition unit 110 at an inner side of the rib 112 formed to be protruded from the partition unit 110, and as the air blowing fan 120 rotates, ambient air is introduced through the inlet opening 111 formed in the partition unit 110.

Referring to FIG. 2, the motor unit 130 may be connected to the air blowing fan 120 to rotate the air blowing fan 120.

Namely, the motor unit 130 may be installed in the motor installation portion 131 formed in the partition unit 110 and connected to the air blowing fan 120. When the motor unit 130 rotates, the air blowing fan 120 is also rotated in conjunction therewith.

Referring to FIG. 2, the air guide unit 140 may be connected to the rib 112 formed to be protruded from the partition unit 110 to form the outlet opening 141. As the air guide unit 140 is connected to the rib 112, air leakage when air introduced through the inlet opening 111 flows out through the outlet opening 141 is prevented.

Figure 3:
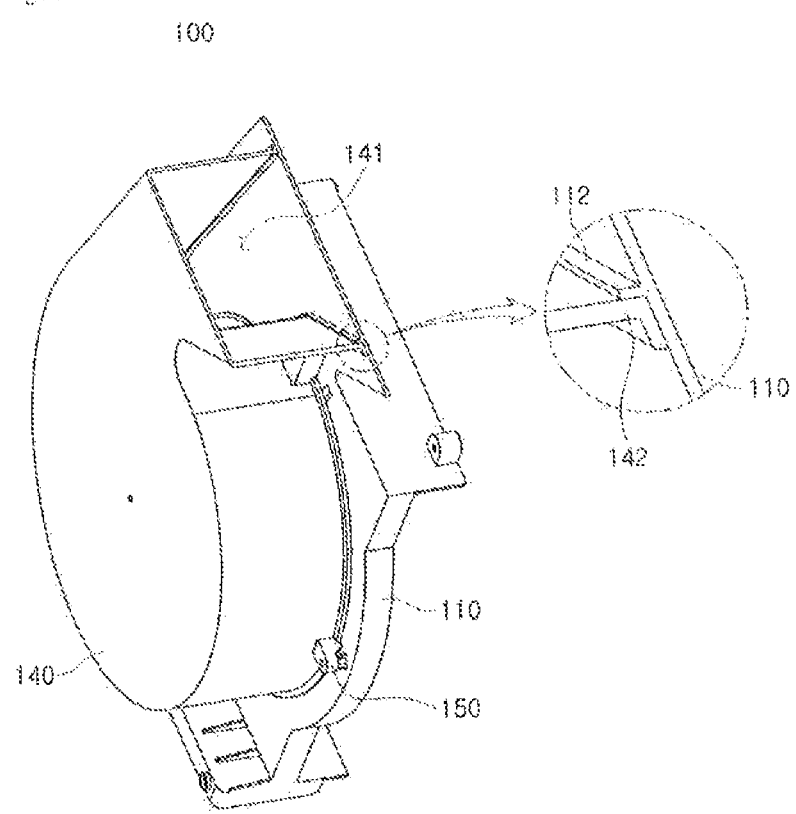
FIG. 3 is an assembled perspective view of the air blowing unit having the air leakage preventing structure according to an embodiment of the present invention.

Here, as illustrated in FIG. 3, when the air guide unit 140 and the partition unit 110 are coupled, an end portion of the air guide unit 140 is connected to the rib 112 formed in the partition unit 110.

When the air guide unit 140 and the partition unit 110 are coupled, a certain space is formed between the air guide unit 140 and the partition unit 110, in which the motor unit 130 and the air blowing fan 120 may be disposed.

Also, when the air guide unit 140 and the partition unit 110 are coupled, the outlet opening 141 is formed to allow air introduced from the outside through the inlet opening 111 of the partition unit 110 to flow out therethrough.

Namely, air introduced through the inlet opening 111 formed on the partition unit 110 may flow in the internal space formed between the air guide unit 140 and the partition unit 110 and flow out through the outlet opening 141.

Here, air introduced through the inlet opening 111 may be leaked through a gap in a portion in which the air guide unit 140 and the partition unit 110 are coupled (i.e., a gap in the coupled portion between the air guide unit 140 and the partition unit 110).

In order to prevent air leakage, in a related art, an air leakage preventing member made of polyurethane (PU) foam, or the like, is disposed in the gap in the portion in which the air guide unit 140 and the partition unit 110.

However, when the air leakage preventing structure and the air cleaner are used on a continual basis over a period of time, the air leakage preventing member made of PU foam, or the like, is worn thin and effused as powder, decreasing an air leakage preventing effect.

In comparison, in the air leakage preventing structure and the air cleaner 500 having the same according to an embodiment of the present invention, since the air guide unit 140 is tightly coupled to the rib 112 protruded from the partition unit 110, a gap in the portion in which the air guide unit 140 and the partition unit 110 are coupled can be narrowed.

Accordingly, even without an air leakage preventing member made of PU foam, or the like, air leakage can be prevented.

However, it should be appreciated that, in the air leakage preventing structure and the air cleaner 500 having the same according to an embodiment of the present invention, an installation of an air leakage preventing member made of PU foam, or the like, between the air guide unit 140 and the partition unit 110 or between the air guide unit 140 and the rib 112 is not excluded.

Meanwhile, the air guide unit 140 may include a connection portion 142 connected to the rib 112. Here, the connection portion 142 may have a linear shape as illustrated in FIG. 4 or an end portion of the connection portion 142 may be bent as illustrated in FIG. 5.

Namely, the connection portion 142 may be formed by bending an end portion of the air guide unit 140, and in this case, one side of the connection portion 142 may be connected to the rib 112, and the other side of the connection portion 142, which is bent, may be connected to the partition unit 110.

Figure 5:
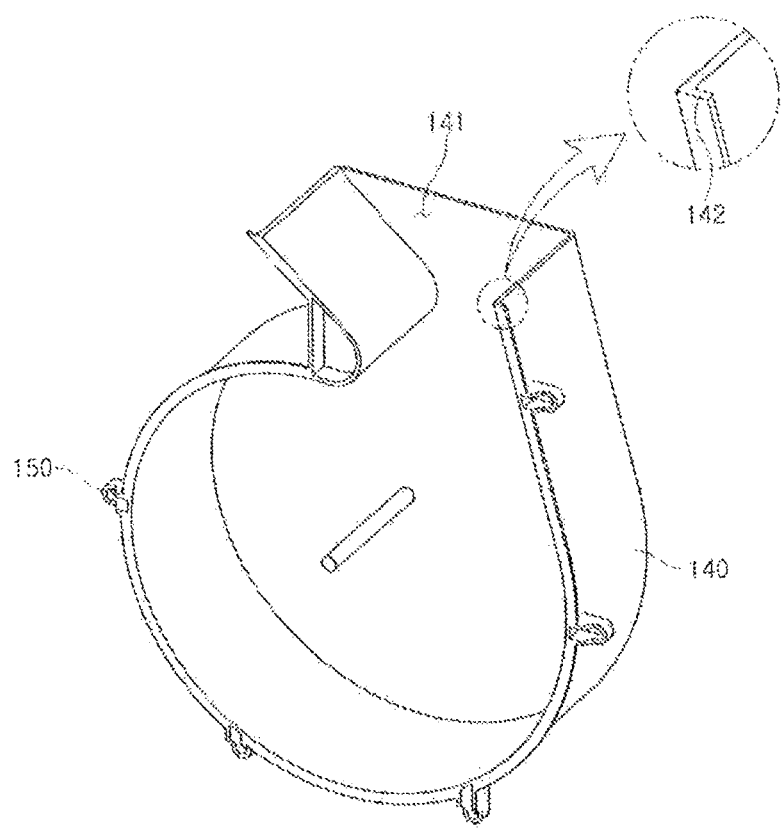
FIG. 5 is a view illustrating an air guide unit included in the air blowing unit having the air leakage preventing structure according to an embodiment of the present invention.

As illustrated in FIG. 3 or 5, the connection portion 142 provided in the end portion of the air guide unit 140 may be bent to have an 'L' shape.

Thus, since the air guide unit 140 is connected to both the rib 112 and the partition unit 110, a gap in the portion in which the air guide unit 140 and the partition unit 110 are coupled can be narrowed.

In this case, however, a shape of the bent portion of the connection portion 142 is not limited to the 'L' shape, and the bent portion of the connection portion 142 may have any shape as long as one side of the connection portion 142 is connected to the rib 112 and the other side thereof is connected to the partition unit 110.

Meanwhile, as illustrated in FIG. 2, the rib 112 formed in the partition unit 110 may have a shape corresponding to a shape of the air guide unit 140.

The air guide unit 140 may be in contact with an outer portion of the rib 112 so as to be connected thereto. Here, as illustrated in FIG. 3, the connection portion 142 of the air guide unit 140 may be connected to the rib 112 and the partition unit 110 at an outer side of the rib 112.

Referring to FIGS. 2 and 3, a fastening unit 150 may be formed on one side of the air guide unit 140 and coupled to the partition unit 110.

Namely, a screw or a bolt may be inserted into the fastening unit 150 to couple the fastening unit 150 to the partition unit 110.

A degree of adhesion between the air guide unit 140 and the rib 112 may be increased by fastening force of a screw or a bolt inserted into the fastening unit 150, and thus, a gap in the coupled portion between the air guide unit 140 and the partition unit 110 can be further narrowed.

Hereinafter, operations and effects of the air cleaner 500 having the air leakage preventing structure according to an embodiment of the present invention will be described.

Figure 6:
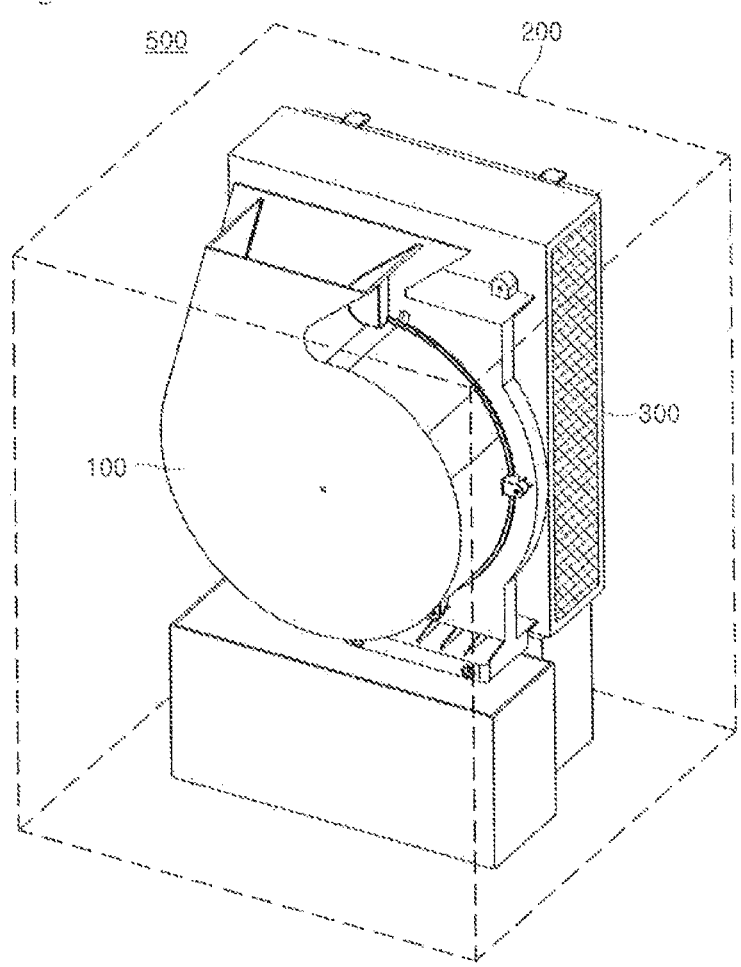
FIG. 6 is a perspective view of an air cleaner having an air leakage preventing structure according to an embodiment of the present invention.

First, referring to FIG. 6, in the air cleaner having an air leakage preventing structure, an air blowing unit 110 having an air leakage preventing structure is disposed within a housing 200.

A filter unit 300 is disposed within the housing 200 and purifies air introduced to the interior of the housing 200 by the air blowing unit 100.

Next, air introduced to the interior of the housing 200 by the air blowing unit 100 is purified by the filter unit 300, introduced to the interior through the inlet opening 111 of the partition unit 110 of the air blowing unit 100, and subsequently, flows out through the outlet opening 141.

Here, the air introduced to the interior of the housing 200 through the inlet opening 111 flows out through the outlet opening 141, without being leaked outwardly by virtue of the air leakage preventing structure provided in the air blowing unit 110.

The invention claimed is:

1. An air leakage preventing structure comprising:
 a partition unit having an inlet opening formed on one side thereof to allow air to be introduced therethrough and having a rib formed to be protruded from the circumference of the inlet opening;
 an air blowing fan coupled to the partition unit and rotating to allow air to be introduced through the inlet opening;
 a motor unit connected to the air blowing fan to rotate the air blowing fan; and
 an air guide unit connected to the rib formed to be protruded from the partition unit to form an outlet opening, and preventing air leakage when air introduced through the inlet opening flows out through the outlet opening; and,
 wherein the rib is protruded from one side of the partition unit, and
 wherein the air guide unit has a connection portion that is coupled to the rib from the direction opposing the one side of the partition unit, and
 wherein the connection portion has a bent shape so as to closely contact the one side of the partition unit and one surface of the rib, respectively.

2. The air leakage preventing structure of claim 1, wherein the connection portion provided in the air guide unit is bent to have an 'L' shape.

3. The air leakage preventing structure of claim 1, wherein the connection portion contacts closely with an outer surface of the rib.

4. The air leakage preventing structure of claim 1, wherein the rib has a shape corresponding to a shape of the air guide unit.

5. The air leakage preventing structure of claim 1, wherein the air guide unit has a fastening unit formed on one side thereof and coupled to the partition unit.

6. An air cleaner comprising:
 an air blowing unit having the air leakage preventing structure of claim 1;
 a housing in which the air blowing unit is disposed; and
 a filter unit disposed within the housing and purifying air introduced to the interior of the housing by the air blowing unit.

* * * * *